United States Patent Office.

CARL JUNG, OF VIENNA, AUSTRIA-HUNGARY, ASSIGNOR OF TWO-THIRDS TO ADOLF KITTEL AND ADOLF BRECHER, OF SAME PLACE.

INSULATING COMPOSITION.

SPECIFICATION forming part of Letters Patent No. 662,444, dated November 27, 1900.

Application filed December 19, 1899. Serial No. 740,891. (Specimens.)

*To all whom it may concern:*

Be it known that I, CARL JUNG, a subject of the Emperor of Austria-Hungary, residing at Vienna, Empire of Austria-Hungary, have invented a certain new and useful Improved Insulating Composition, of which the following is a full, clear, and exact specification.

This invention relates to the manufacture of compositions for insulating purposes and for all purposes where vulcanized india-rubber has hitherto been employed, the object of the invention being to considerably cheapen caoutchouc products without depreciating their quality.

With this object in view my invention consists in a composition of matter consisting, primarily, in a vulcanizable mixture of caoutchouc and casein.

The invention also consists in such a composition having added thereto in comparatively small amounts a resin or resins or also in small amounts a solid hydrocarbon.

My invention also consists in the method of preparing the above composition of matter.

In carrying out my invention I take washed crude caoutchouc and add thereto a substantial amount of finely-pulverized casein and mix the two ingredients thoroughly and intimately, preferably by means of a kneading or mixing machine well known in the art of manufacturing rubber, until the whole forms a homogeneous mass. I find that the best results are attained if the mass is maintained at a temperature of about 50° centigrade during the progress of the mixing operation. A very advantageous mixture consists of one part, by weight, of crude caoutchouc to one part of casein. During the mixing operation a comparatively minor quantity of a resin or resins—such as gum-sandarac, colophony, &c.—may be added in the form of powder or of a resin solution precipitated by means of an alkali salt or organic acid, or such solid hydrocarbons as paraffin may be added also in minor quantities. The above subsidiary additions are to be made, preferably, in the presence of sufficient heat.

In order to vulcanize the above mixture, a certain amount of sulfur is added either on first mixing the ingredients or subsequently, and the whole is then submitted to the vulcanizing operation and converted into a substance having the appearance and physical properties of ordinary india-rubber and not inferior in quality thereto. Whether a hard or soft rubber-like product is obtained depends on the amount of sulfur or other ingredients added and the method of treatment, as will be clear to those familiar with the art of manufacturing rubber.

By adding indifferent coloring matters or pigments any desired color may be imparted to the product.

What I claim, and desire to secure by Letters Patent, is—

1. As a new composition of matter, a mixture of undissolved raw caoutchouc and casein.

2. As a new composition of matter, a vulcanized mixture of caoutchouc and casein.

3. As a new composition of matter, a mixture of raw caoutchouc, casein and resin.

4. As a new composition of matter, a vulcanized mixture of caoutchouc, casein and resin.

5. As a new composition of matter, a mixture of undissolved raw caoutchouc, casein and a solid hydrocarbon.

6. The process of preparing a rubber-like substance which consists in adding undissolved raw caoutchouc to casein and thoroughly kneading or mixing the mass.

7. The process of preparing a rubber-like substance which consists in adding undissolved raw caoutchouc to casein and thoroughly kneading or mixing the mass, and vulcanizing the same.

In witness whereof I have hereunto set my hand in presence of two witnesses.

CARL JUNG.

Witnesses:
 RUD. ZIPSERK,
 JOSEF KOETTH.